United States Patent

Pickeral et al.

Patent Number: 5,812,655
Date of Patent: Sep. 22, 1998

[54] FLEXIBLE SERVICE ACCESS CODE (SAC)

[75] Inventors: Eddie L. Pickeral, Plano; Timothy A. Morgan, Garland, both of Tex.

[73] Assignee: MCI Communications Corporation, Washington, D.C.

[21] Appl. No.: 723,748

[22] Filed: Sep. 30, 1996

[51] Int. Cl.$^6$ .......................... H40M 3/42; H40M 15/06; H40M 3/00; H40M 7/00

[52] U.S. Cl. .......................... 379/207; 379/127; 379/196; 379/220

[58] Field of Search .................................. 379/201, 207, 379/219, 220, 221, 242, 243, 244, 127, 196, 197

[56] References Cited

U.S. PATENT DOCUMENTS

| | | | |
|---|---|---|---|
| 4,191,860 | 3/1980 | Weber | 379/221 X |
| 5,095,505 | 3/1992 | Finucane et al. | 379/201 |
| 5,412,714 | 5/1995 | Bogart et al. | 379/207 X |

*Primary Examiner*—Harry S. Hong

[57] ABSTRACT

A flexible service access code (FLEX SAC) permits originating callers to dial up to a fifteen-digit extension in place of a traditional service access code (SAC), such as for example a "700", "800", and "900" extension followed by a seven-digit extension. In addition to providing the originating caller, the destination caller, and the long distance carrier greater flexibility in the digits dialed for a SAC call, FLEX SAC permits routing on private trunks and remote access trunks, as well as the shared access trunks conventionally used for SAC calls. If the switch supports FLEX SAC calls, a FLEX SAC table (pertaining to the originating trunk group over which the call was routed) is parsed to find the called number. If the called number is found in the FLEX SAC table, additional fields indicating ANI screening, OLI screening, external routing, and the transaction group are parsed in the relevant FLEX SAC table. If either the OLI or the ANI fields indicate that OLI or ANI screening is to be performed, respectively, then an OLI or an ANI table for the switch is parsed to determine whether the call should be blocked, because a call from the originating caller is not supported by the switch. If the external routing field indicates an external routing table must be used to route the call, the external routing table is queried using the called number and the value of the transaction group field, which defines the call type to the external routing table. If the called number is not found in the FLEX SAC table, or external routing is not supported for the call, or a response is not received from the external routing table, then the call is routed using an in-switch translation table.

29 Claims, 11 Drawing Sheets

| RECEIVED NUMBER | DESTINATION NUMBER |
|---|---|
| ... | ... |
| 123456 | 804-555-5555 |
| ... | ... |

FIG.6A

| OLI | BLOCK? (Y/N) |
|---|---|
| ... | ... |
| AB | "N" |
| ... | ... |

FIG.6B

| ANI | BLOCK? (Y/N) |
|---|---|
| ... | ... |
| ABC-DEF-GHIJ | "N" |
| ... | ... |

FIG.6C

| RECIEVED NO. | TRANSACTION NO. | AVAILABILITY (DATE/TIME) | STATUS | DESTINATION NO. | ALTERNATE NO. |
|---|---|---|---|---|---|
| 212-555-5555 | DEF | 10AM-2PM, SAT. ONLY | AVAILABLE | 703-222-2222 | NONE |
| 202-555-5555 | ABC | 9AM-5PM, EVERYDAY | BUSY | 212-111-1111 | 212-444-4444 212-333-3333 |
| 123456 | ABC | ALWAYS | AVAILABLE | 837-555-5555 | 202-444-4444 |

FIG.6D

FLEXIBLE SERVICE ACCESS CODE (SAC)

BACKGROUND OF THE INVENTION

1. Field of the Invention

This invention relates generally to special service call processing in a telecommunication networks, and more specifically, to switches of a telecommunication network that allow usage of flexible service access codes in place of traditional service access codes, such as for example "700", "800", and "900" access codes.

2. Related Art

A typical telecommunication network comprises multiple telecommunications facilities located throughout a geographical area. When a user makes a call, the call is routed to one or more switches before reaching its destination.

In an ordinary POTS ("plain old telephone system") long distance telephone call, a telephone station is identified by the 10-digit DDD (direct distance dialing) designation. In other words, an originating caller (the customer placing the call) dials the DDD-number, represented as NPA-NXX-XXXX. NPA (number plan area) refers to a geographic location for the destination caller (the customer receiving the call). NXX represents a termination exchange, identifying a central office switch in the NPA (specifically within the local area of the originating caller) to which the call is routed. XXXX identifies the destination caller, or more specifically, a unique telephone destination (station identification) connected to the specific NXX (terminating exchange) located within the NPA. In these designations, "N" refers to any digit except 0 or 1, and "X" refers to any digit between 0 and 9. Therefore, in a POTS DDD-type long distance call, the call is routed on a geographical basis, because the NPA (also known as the area code) provides the geographical location of the destination.

Contemporary telecommunication networks provide customers the capability of using either the general public network, placing the call in the conventional NPA-NXX-XXXX manner, as well as the capability of defining a custom virtual network (VNet). With a VNet, a customer defines a private dialing plan, including plan telephone numbers. A VNet customer is not limited to the default telephone numbers allocated to a public telecommunication system dedicated to a specific geographic region, but can define custom telephone numbers. These custom telephone numbers are translated by the long distance carrier switches, and routed to the appropriate destinations.

Long distance carriers also provide their customers special service call processing. Special service calls, also known as "700", "800" and "900" telephone calls, provide the customer the ability to receive special call features. These include toll-free calls, calling card calls, special rate calls, etc.

One well known example of a special service call is an "800" INward WATS (wide are telephone service) call. INWATS service allows a long distance customer to reverse the charges for originating callers, i.e., permitting originating callers to call him or her toll-free. INWATS service permits a customer to designate areas within the Continental United States (CONUS) from which callers may call him or her. If supported by the long distance carrier, "800" INWATS service may also allow a customer to designate particular times within the day, days within the week, etc. that users may call him or her.

When an originating caller wishes to call the customer paying for the "800" INWATS service, the originating caller dials the digits "800" in place of an NPA number, i.e., the originating caller dials 800-NXX-XXXX. Since 800 does not designate a particular NPA, and therefore, does not designate a particular geographical area for the destination, the digits 800 represent a "dummy" telephone number referred to as a service access code (SAC). Hence, the digits 800-NXX-XXXX must be translated by the long distance carrier into an appropriate destination in order to route the call.

The SAC digits (i.e., "700", "800", "900") provide the originating caller and the destination caller little flexibility in the digits that can be dialed for a SAC call, because they are constrained to the pre-designated "dummy" SAC digits, such as "800." Moreover, the long distance carriers are constrained by the dummy "700", "800", "900" digits because increased special service call usage has made the carriers run out of available numbers. For instance, the digits 800-NXX-XXXX allow only $10^7$ call variations.

In addition, traditional SAC traffic is originated only on shared access trunks, including Feature Group C trunks, Feature Group D trunks, Inter-machine trunks, and Reseller trunks. Shared access trunks are trunks that are used by a variety of different customers, on a per-call basis. However, this does not provide customers the opportunity to route SAC traffic over private trunks, used by customers on an individual basis.

SUMMARY OF THE INVENTION

The instant invention provides a method and means for providing a long distance switch the flexibility to accept and route a flexible SAC (FLEX SAC), in lieu of the well-known fixed SACs "700", "800", "900", etc. FLEX SACs are not restricted to a pre-determined three-digit extension that are dialed by an originating caller for special service calls, but can instead be any number of digits that are pre-defined by a long-distance carrier for a customer. FLEX SAC calls are also not restricted to any particular trunk groups, and may be routed over virtually any trunk group types.

When a call is received at a long distance switch, it is first determined whether the switch receiving the call supports processing of FLEX SACs. If it is determined that the switch receiving the call does not support FLEX SACs, then the call is processed as a common telephone call by routing the call to a destination caller and building an appropriate call record for the call. However, if it is determined that the switch receiving the call supports FLEX SACs, then it must be determined whether the originating trunk group over which the call was routed supports FLEX SACs.

If it is determined that the call requires authorization processing, then the switch determines whether the authorization code received for the call is valid. If it is determined that the authorization code is not valid, then the switch blocks the call and builds a call record indicating that FLEX SAC processing is not supported for the call.

If it is determined that the originating trunk group does not support FLEX SACs, then the call is routed as a common telephone call and an appropriate call record is built indicating that FLEX SACs are not supported for the call.

On the other hand, if it is determined that the originating trunk group supports FLEX SACs, then the switch attempts to match the called number dialed by the originating caller to a FLEX SAC entry in a FLEX SAC table designated for the originating trunk group. Next, the FLEX SAC table is parsed for relevant FLEX SAC parameters for the call.

If the FLEX SAC table indicates that originating line information screening is required, then the switch determines whether to block the call according to the originating line information of the originating caller.

If the FLEX SAC table indicates that automatic number identification screening is required, then the switch determines whether to block the call according to the automatic number identification information of the originating caller.

If the FLEX SAC table indicates that an external routing table must be used to route the call, then an external routing table is queried by sending it the called number and a transaction group identification number found in the FLEX SAC table that corresponds to the called number.

If a response is not received from the external routing table after a pre-determined period, and if the called number is matched to an entry in an in-switch translation table, then the switch routes the call to the entry in the in-switch translation table and builds a call record indicating that FLEX SAC processing is supported by the call. If a response is not received from the external routing table after a pre-determined period, and if the called number is not matched to an entry in an in-switch translation table, then the switch blocks the call from being routed and builds a call record indicating that FLEX SAC processing is supported by the call.

On the other hand, if a response is received from the external routing table after a pre-determined period and the response is valid, then the switch routes the call as indicated by the external routing table and builds a call record indicating that flexible service access code processing is supported for the call. If a response is received from the external routing table after a pre-determined period and the response is not valid, then the switch performs failure processing for the call by returning a failure code back over the originating trunk group for which the call was routed.

If the FLEX SAC table indicates that an external routing table is not to be used to route the call, and if the called number is matched to an entry in an in-switch translation table, then the switch routes the call to the entry in the in-switch translation table and builds a call record indicating that FLEX SAC processing is supported by the call. If the FLEX SAC table indicates that an external routing table is not to be used to route the call, and if the called number is not matched to an entry in the in-switch translation table, then the switch blocks the call from being routed and builds a call record indicating that FLEX SAC processing is supported by the call.

If the called number could not be matched to an entry in the FLEX SAC table, and if the called number is matched to an entry in an in-switch translation table, then the switch routes the call to the matched number and builds a call record indicating that FLEX SAC processing is supported by the call. If the called number is not matched to an entry in the FLEX SAC table, and if the called number is not matched to an entry in the in-switch translation table, then the switch blocks the call from being routed and builds a call record indicating that FLEX SAC processing is supported by the call.

FEATURES AND ADVANTAGES

The instant invention improves special service call processing by providing much greater flexibility in the SAC digits available to the user. In existing special service call processing, the user is constrained to dial the SAC digits "700", "800", "900", etc. Conversely, the instant invention provides the customer the ability to dial up to a 15 digits between 0 and 9 that are recognizable to the switch used by the long distance carrier. This number is referred to as a FLEX SAC number because it provides flexible SAC processing. The caller need not dial digits in the traditional SAC-NXX-XXXX format to make such a call, because (1) the digits dialed by the customer are recognized by the long distance carrier's switch as FLEX SAC digits because they have been pre-defined between the customer and the carrier, and (2) the long distance carrier's switch handles FLEX SAC processing of the received number before any translation and routing of the received number is performed, meaning that the received digits are handled like private numbers in a special dialing plan.

Unlike traditional SAC calls, which are originated only on shared access trunks (e.g., FGC, FGD, IMT, and Reseller trunks), a FLEX SAC call may be originated on private trunks, used on an individual basis. Therefore, FLEX SAC allows for a SAC call to be originated over virtually any type of trunk, including but not limited to FGB, FGC, FGD, DAL, FGD/DAL, VNet/DAL, ISUP Reseller, PRI, and IMT trunks. These trunks are further defined below.

Another key advantage is that FLEX SAC numbers can be customized for individual customers, such that different customers can have different FLEX SAC numbers. This provides customers another type of flexibility over traditional SAC number dialing.

FLEX SAC functionality can also be provided to customers who have private dialing plans with a carrier. Initially, the customer dials an access number, which identifies the customer to the carrier. After the customer is recognized by the carrier, the customer can enter FLEX SAC digits that are translated by the carrier into the appropriate special service call.

BRIEF DESCRIPTION OF THE DRAWINGS

The invention is best understood by reference to the figures wherein references with like reference numbers indicate identical or functionally similar elements. The elements within the figures are functional entities and may or may not be separate physical entities.

FIG. 6A illustrates an exemplary in-switch translation table.

FIG. 6B illustrates an exemplary originating line information (OLI) screening table.

FIG. 6C illustrates an exemplary automatic number identification (ANI) screening table.

FIG. 6D illustrates an exemplary external routing table.

DETAILED DESCRIPTION OF THE PREFERRED EMBODIMENTS

A preferred embodiment of the present invention is now described with reference to the figures where like reference numbers indicate identical or functionally similar elements. While specific configurations and arrangements are discussed, it should be understood that this is done for illustrative purposes only. A person skilled in the relevant art will recognize other configurations and arrangements can be used without departing from the spirit and scope of the invention. It will apparent to a person skilled in the relevant art that this invention can be employed in a variety of other devices and applications.

The instant invention improves special service call processing by providing much greater flexibility in the SAC digits available to the user. Specifically, a FLEX SAC call is not constrained to dial the SAC digits "700", "800", "900", followed by a seven-digit extension, and may alternatively dial up to 15 digits between 0 and 9 that are recognizable to the IXC switch. In addition, a FLEX SAC call, unlike traditional SAC calls, may originate on virtually any type of trunk group, and is therefore not constrained to originate on a shared access trunk group, as with existing SAC calls. These features will be understood to those of skill in the art with reference to the following discussion.

Figure 1:
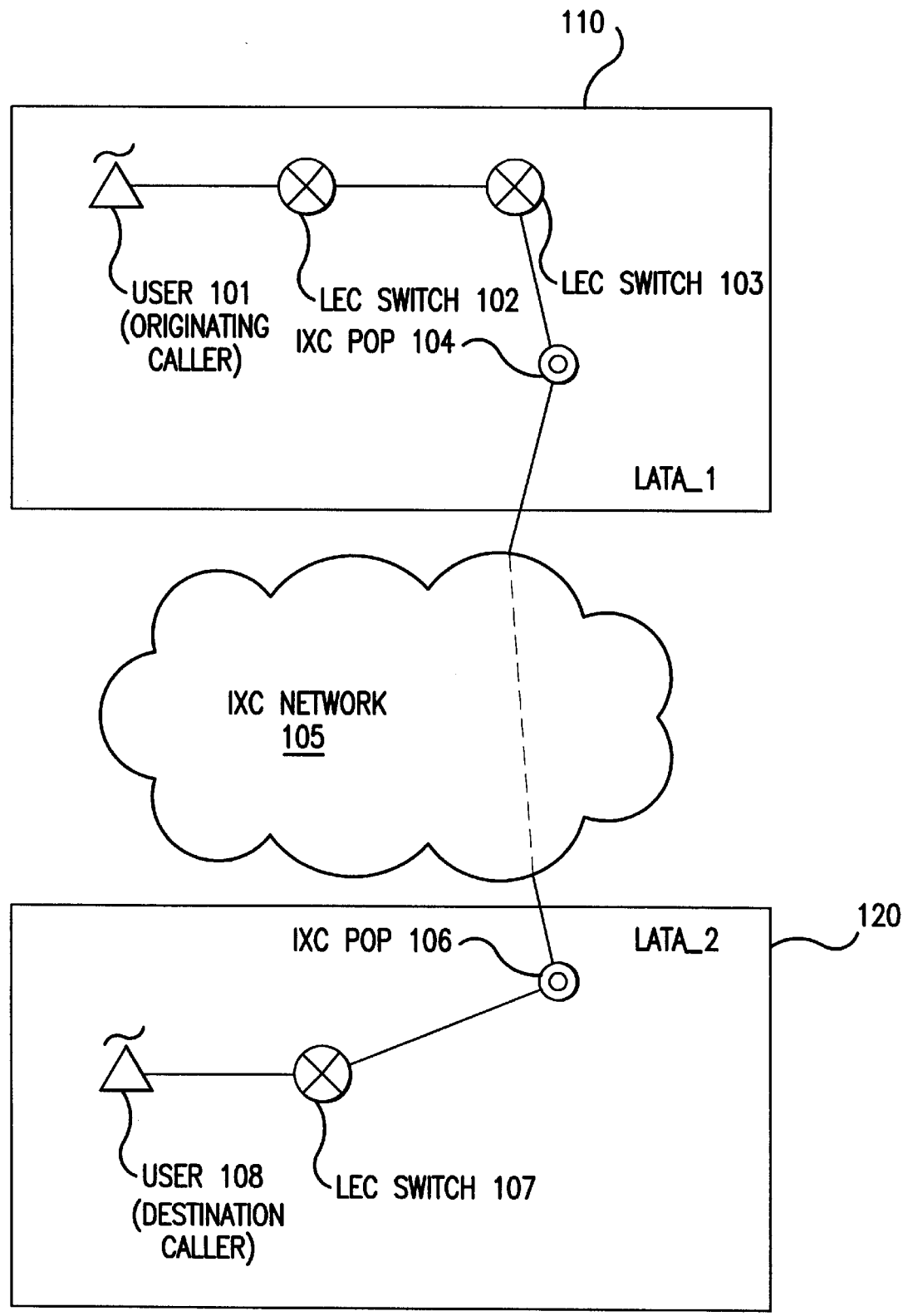
FIG. 1 is schematic illustration showing the routing of a long distance telephone call.

FIG. 1 is a schematic illustration showing the routing of a long distance telephone call. FIG. 1 shows telephone users 101, 108, who live in different Local Access and Transport Areas (LATAs) 110 and 120. LATA is a term that refers to the 161 local geographical areas within the United States wherein Local Exchange Carriers (LECs) provide telecommunication services. LEC is a term referring to the local telephone companies, which includes the Regional Bell Operating Companies (RBOCs) and a number of independent companies (e.g., GTE). The LECs provide local transmission services for their customers.

Long distance transmission of calls is provided by Inter-Exchange Carriers (IXCs). Therefore, IXC refers to the long distance carriers (e.g., MCI Telecommunications Corporation, hereinafter referred to as "MCI") that route telephone calls between the LATAs.

The IXCs interface with the LECs at Points-of-Presence (POPs) within the LATAs. Therefore, a POP is the physical location within the LATA wherein the IXC provides access to its long distance network.

As shown in FIG. 1, user 101 resides in LATA1 110, and user 108 resides in LATA2 120. Local telephone calls for LATA1 110 are handled an by a LEC (e.g., one of the Regional Bell Operating Companies). Similarly, local telephone calls for LATA2 120 are handled by either the same LEC or a different LEC.

The LEC for LATA1 110 includes as part of its network LEC switches 102 and 103. The LEC for LATA2 120 includes as part of its network LEC switch 107.

IXC network 105 has an IXC POP 104 in the LATA1 110. IXC network 105 also has an IXC POP 106 in LATA2 120.

When user 101 wishes to place a call to user 108, the telephone call traverses the path shown in FIG. 1. The LEC carrier for LATA1 110 routes the telephone call from user 101 to LEC switch 102. LEC switch 102 switches the call for transport to LEC switch 103. LEC switch 103 switches the call for transport to IXC POP 104. The IXC carrier used by user 101 routes the call from IXC POP 104 in LATA1 110 to IXC POP 106 in LATA2 120 via its IXC network 105. The LEC carrier for LATA2 120 then routes the call from IXC POP 106 to its LEC switch 107. Finally, the call is switched by LEC switch 107 in LATA2 120 for routing to the destination user 108.

A telephone call comes into a switch on a transmission line referred to as the originating port, or trunk. Specifically, a trunk is a communication line between two switches (also known as switching systems).

For example, the call from user 101 is routed from LEC switch 102 to LEC switch 103 via an originating trunk. The originating trunk is one of many transmission lines coming into LEC switch 103 from the same location of origin, which in this case is LEC switch 102. This group of ports comprises an originating trunk group coming into LEC switch 102. Trunk groups are assigned based on traffic demands, such that a trunk group can carry multiple conversations.

There are four well-known protocols for trunk groups that provide access from the LECs to the IXCs, namely Feature Groups A, B, C, D (FGA, FGB, FGC, FGD). In other words, the Feature Groups provide switching regimens that allow access from the LEC switches to the IXCs. Feature groups were described in a tariff filed by the National Exchange Carrier Association with the FCC in order to allow telecommunications users (customers) to designate a particular IXC for their toll calls. IXCs determine the type of service that they can provide their end-users (customers) via the different feature groups.

FGA, a remnant of the earlier period of equal access, offers access to a LEC's network through a subscriber-type line connection instead of a trunk. The customer is required to dial a local number to reach its IXC facilities, then dial an identification number, and finally to dial the long distance numbers of the party being called. For FGA service, the LEC bills the IXC based upon actual monthly use (instead of the total amount of use in minutes).

FGB provides a higher quality trunk line connection from a LATA central office (a main LEC switch) to the IXC facilities, instead of a subscriber-type line. Unlike FGA, which requires customers to initiate the call from within the LEC, FGB allows the IXC user to originate a call from anywhere within the LATA. FGB billings by the IXC are on a flat usage basis.

FGC is a relic of the pre-equal access period, representing the traditional toll service arrangement offered by the LECs to the IXC prior to the breakup of the Bell system. FGC typically provides superior quality service as compared to FGA and FGB.

FGD is the class of service associated with the modern equal access arrangements, wherein the user may designate any IXC. FGD provides all the IXCs identical connections to the LEC switches. FGD provides the highest quality of service, and bills the user for the actual measured use in minutes.

Customers may also purchase private trunks from a carrier. A Dedicated Access Line (DAL) is a private line from a user to either a LEC or an IXC switch. Typically, the DAL is a dedicated line between a Private Branch Exchange (PBX) and a LEC switch or an IXC switch. A PBX is a localized switch, providing users in the same office specific switching functionality. For example, users working in the same office connected to a PBX can typically call one another by simply dialing a four-digit extension. The call is routed by the local PBX switch, versus being routed to the LEC switching facilities.

After processing an incoming call, LEC switch 103 transmits the call to a destination location. In the present case, the destination location is IXC POP 104, but the destination location may alternatively include another switch or some other type of network element. The call is transmitted over a transmission line referred to as the terminating port, or trunk. Similar to the originating port, the terminating port is one of a group of ports going from the switch to the same destination. Hence, the group of ports extending to IXC POP 104 is a terminating trunk group from LEC switch 103.

Figure 2:
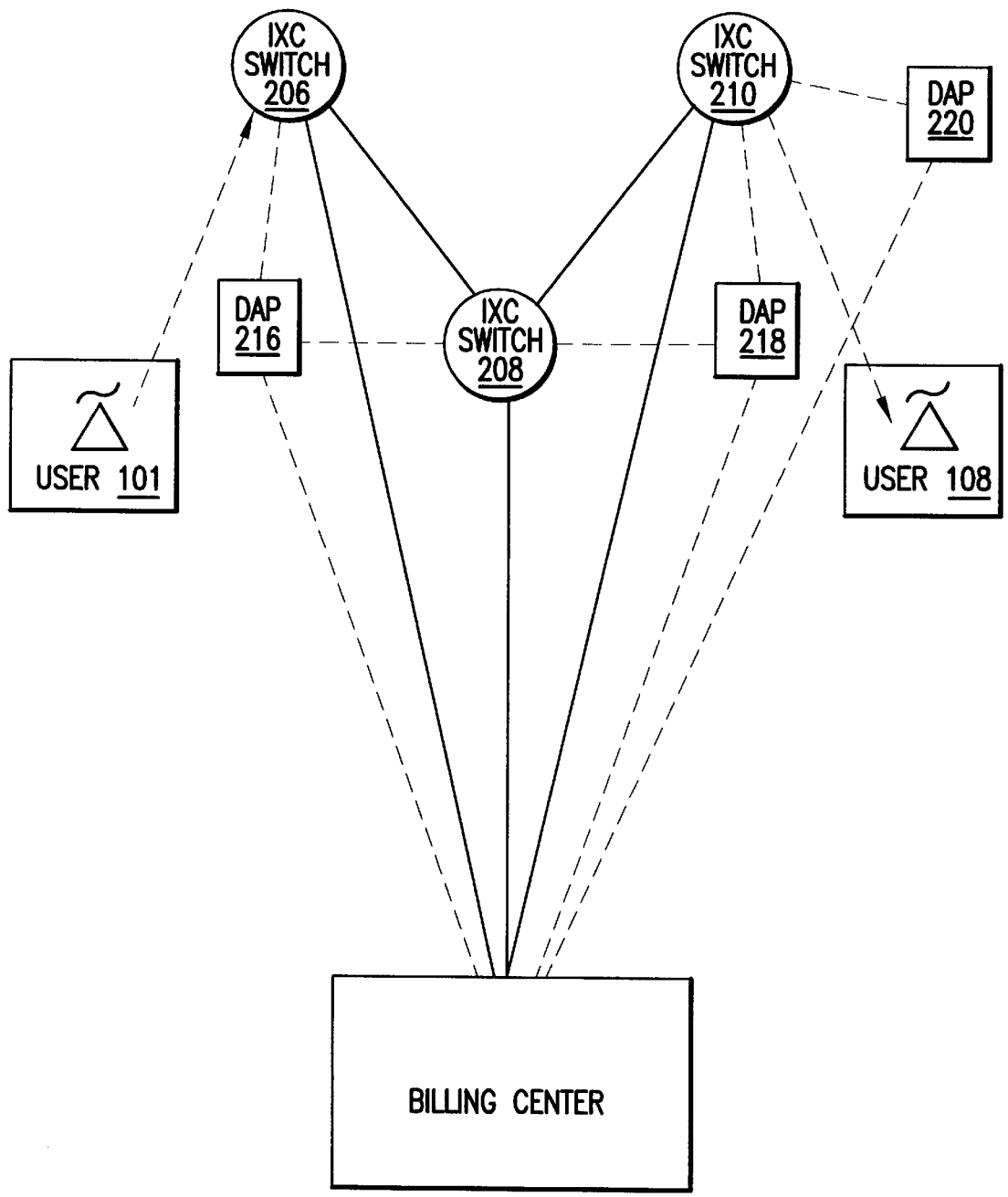
FIG. 2 is a schematic illustration of an exemplary long distance carrier network across the United States.

FIG. 2 illustrates an exemplary IXC network 105 across the United States. For purposes of illustration, user 101 places a call from Los Angeles, Calif. (in hypothetical LATA1 110), to caller 108 located in New York City, N.Y. (in hypothetical LATA2 120) over trunk groups providing FGD level of service. IXC network 105 routes the call from IXC POP 104 to IXC POP 106, which are shown in FIG. 1. IXC POP 104 delivers its trunk groups to IXC switch 206, which is shown in FIG. 2. Similarly, IXC POP 106 delivers its trunk groups to IXC switch 210. The telephone call between users 101 and 108 may typically be transmitted across three (3) IXC switches: the Los Angeles, Calif. switch 206; the Chicago, Ill. switch 208; and the New York City, N.Y. switch 210.

In this scenario, the originating IXC switch is a Los Angeles, Calif. switch 206, and the terminating IXC switch is the New York City, N.Y. switch 210.

The IXC switches may use externally-located translation routing tables, such as Data Access Points (DAPs), to aid in routing the call. As shown in FIG. 2, each switch 206–210 is connected to two or more DAPs 216–220, including a primary DAP 216 and backup DAPs 218, 220. DAPs 216–220 are facilities that receive requests for information from IXC switches 206–210, process the requests, and return the requested information back to the requesting IXC switches 206–210. IXC switches 206–210 use information from the DAPs 216–220 to process calls throughout the network.

When a call passes through an IXC switch 206–210, the IXC switch 206–210 creates a call record. The call record contains information for the call, including but not limited to: routing, billing, call features and troubleshooting information. After the call is terminated, each IXC switch 206–210 that processes the call completes the associated call record. IXC switches 206–210 combine multiple call records into a billing block.

When each IXC switch 206–210 fills the billing block, the IXC switch 206–210 sends the billing block to a billing center 214. Thus, the billing center 214 receives one billing block from each IXC switch 206–210 that handled the call, which in this case would be three billing blocks. The billing center 214 searches each billing block and retrieves the call record associated with the call, thereby retrieving one call record per IXC switch 206–210 that handled the call. The billing center 214 then uses the one or more retrieved call records to generate a billing entry. The billing center 214 is also connected to each DAP 216–220 to retrieve information regarding an IXC switch 206–210 or call record.

Figure 3:
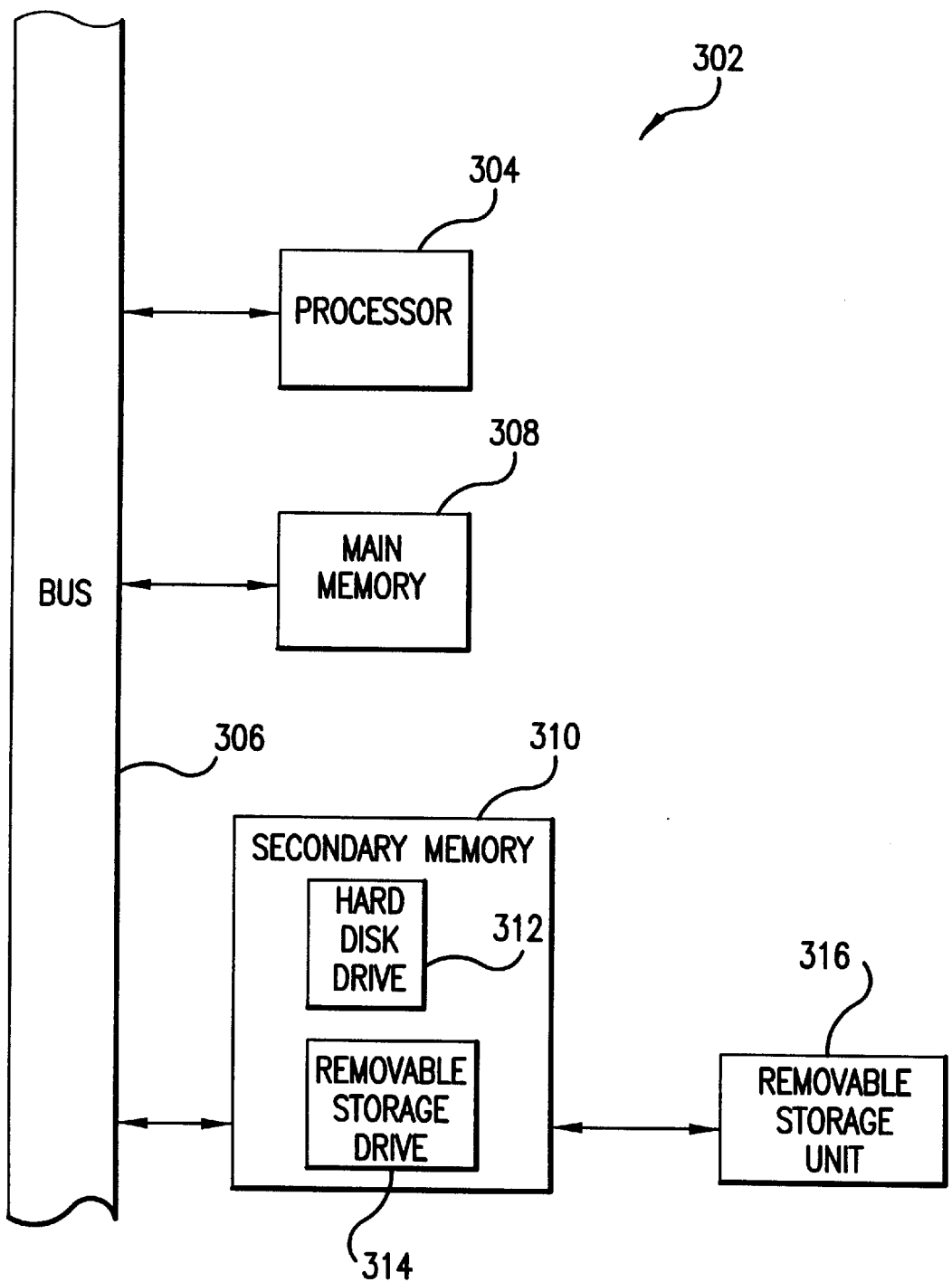
FIG. 3 is a block diagram of a computer system representing a possible implementation of many components of the present invention.

The chosen embodiment of the present invention is computer software executing within a computer system. FIG. 3 shows an exemplary computer system. The computer system 302 includes one or more processors, such as a processor 304. The processor 304 is connected to a communication bus 306.

The computer system 302 also includes a main memory 308, preferably random access memory (RAM), and a secondary memory 310. The secondary memory 310 includes, for example, a hard disk drive 312 and/or a removable storage drive unit 314, representing a floppy disk drive, a magnetic tape drive, a compact disk drive, etc. The removable storage drive 314 reads from and/or writes to a removable storage unit 316 in a well known manner.

Removable storage unit 316, also called a program storage device or a computer program product, represents a floppy disk, magnetic tape, compact disk, etc. As will be appreciated, the removable storage unit 316 includes a computer usable storage medium having stored therein computer software and/or data.

Computer programs (also called computer control logic) are stored in memory 308 and/or the secondary memory 310. Such computer programs, when executed, enable the computer system 302 to perform the functions of the present invention as discussed herein. In particular, the computer programs, when executed, enable the processor 304 to perform the functions of the present invention. Accordingly, such computer programs represent controllers of the computer system 302.

In another embodiment, the invention is directed to a computer program product comprising a computer readable medium having control logic (computer software) stored therein. The control logic, when executed by the processor 304, causes the processor 304 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

Figure 7:
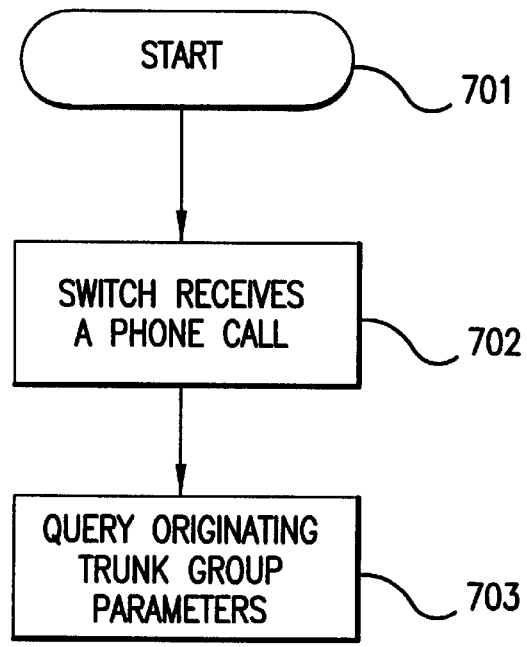
FIG. 7 is a flow chart illustrating the initiation of FLEX SAC processing.

FIG. 7 is a flowchart that shows the initiation of FLEX SAC processing. Processing begins at step 701, wherein control is immediately passed to step 702.

In step 702, IXC switch 206 receives call, i.e., a series of digits based upon the number called by user 101. For a special service type call, IXC switch 206 can receive outpulsed digits from LEC switch 103 that represents a translation of the number originally dialed by user 101, or alternatively IXC switch 206 can receive the digits originally dialed by user 101.

For example, user 101 may dial a SAC number over an FGD trunk that is then translated by LEC switch 103 to a second number, and that second number is outpulsed to IXC network 105. In this case, IXC switch 206 receives the number outpulsed from LEC switch 103.

On the other hand, user 101 may dial an "800" number over an FGD trunk, wherein IXC switch 206 receives the same number originally dialed by user 101. Regardless of what digits IXC switch 206 receives, the IXC switches 206–210 and external routing tables (DAPs 216–220) must convert the number for appropriate routing to destination user 108.

In step 703, it is determined that the originating trunk group parameters for IXC switch 206 must be queried, in order to determine whether FLEX SAC call processing applies.

Figure 8:
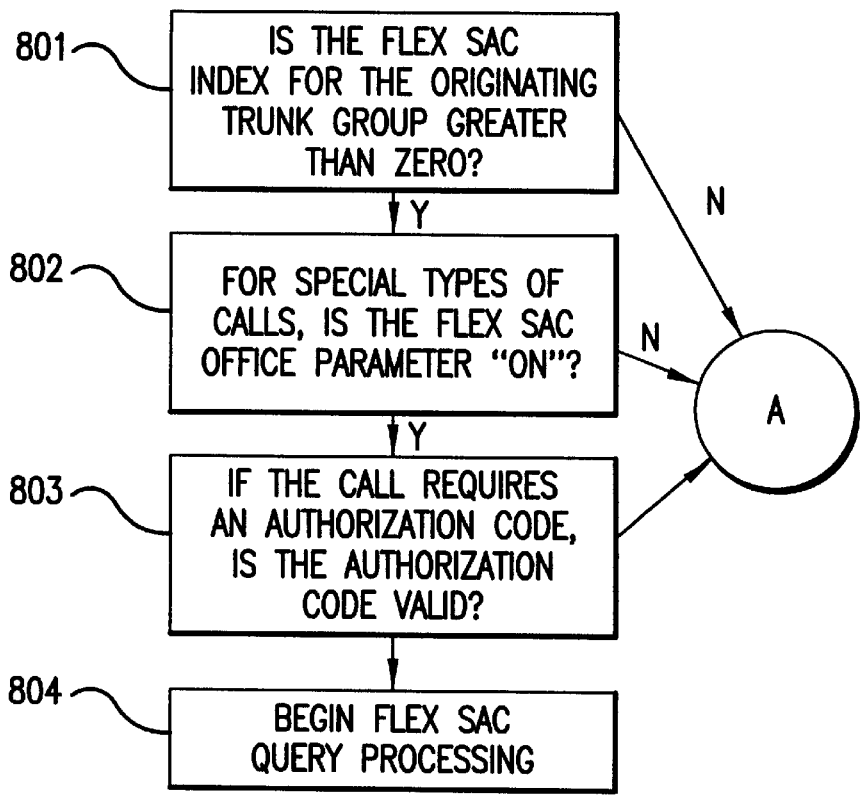
FIG. 8 is a flow chart illustrating the querying of the trunk group parameters from the office parameter table.

FIG. 8 is a flowchart illustrating the querying of the trunk group parameters using FLEX SAC call processing. In step 801, it is determined whether the FLEX SAC index for the originating trunk route is set to 0, or alternatively, to a value greater than zero. Each originating trunk group, i.e., each trunk group routing calls to the IXC switch, has an associated index indicating whether FLEX SAC is or is not available for calls originating thereon. The FLEX SAC indices are explained in detail with reference to FIG. 4 below. If the index is 0 for the originating trunk group, then the call is handled as an ordinary SAC call.

However, if the index has a value greater than zero for the originating trunk group, then the call is handled as a FLEX SAC call and a FLEX SAC query is begun. In step 801, if the FLEX SAC index for the originating trunk group is set to 0, then control passes to step 901 of FIG. 9.

Figure 9:
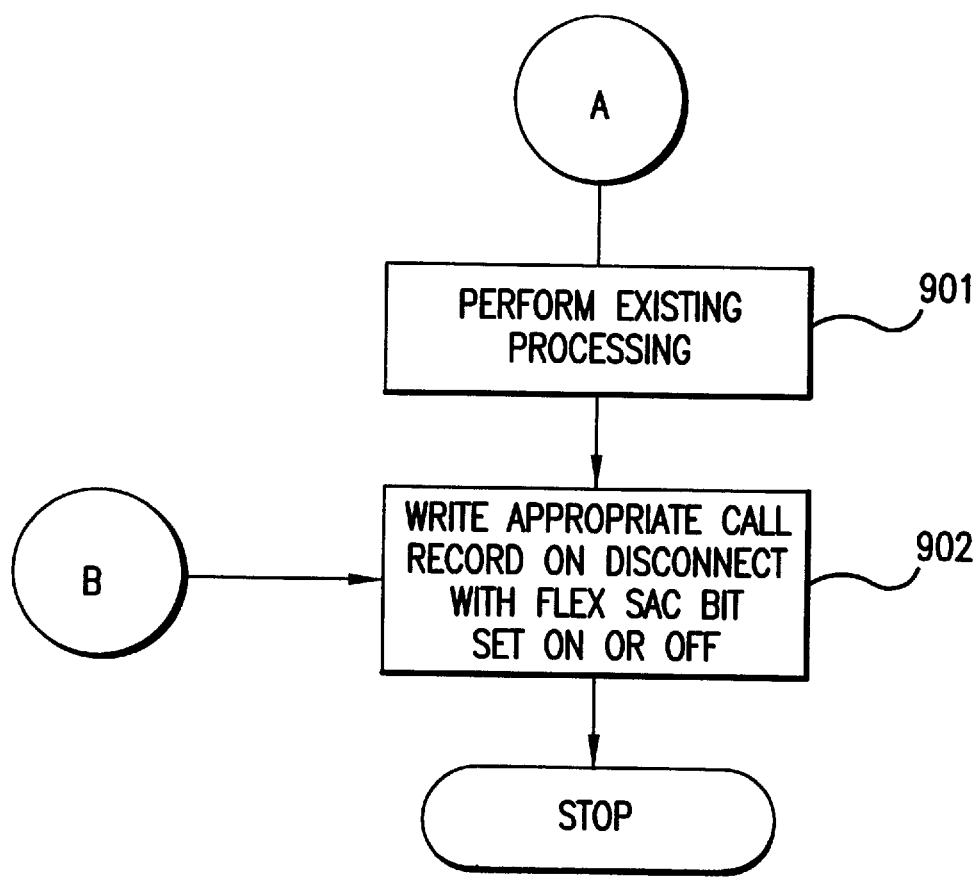
FIG. 9 is a flow chart illustrating the continuation of call processing and setting of a FLEX SAC flag in the call record, depending upon whether FLEX SAC processing is implemented.

In step 901 of FIG. 9, the call is handled as an ordinary DDD call introduced into the IXC network. If the call has the form NPA-NXX-XXXX, where NPA is the geographical location of the destination user, the call is routed according to well-known methods. Conversely, if the first three digits of the call represent a recognized SAC number, such as "700", "800", "900", inter alia, then well-known special call processing is performed. Specifically, an ordinary SAC call (i.e., a non-FLEX SAC call) is routed using either external routing tables such as DAPs 216–220 (as described below with relation to FIG. 11), or in-switch translation (as described below with relation to FIG. 10).

Subsequently, in step 902 the switch creates an appropriate call record to store information related to the call. As mentioned, the call record stores routing, billing, call feature, troubleshooting, etc., information for the call. Since FLEX SAC has not been invoked, the FLEX SAC flag in the call record is set to "OFF."

Conversely, if in step 801 the FLEX SAC index for the originating trunk group is greater than zero, then FLEX SAC processing is supported for the call, and processing is continued in step 802. Although FLEX SAC processing may be supported for any call arriving over a particular originating trunk group, it is also possible to limit FLEX SAC processing to only particular types of telephone calls over that originating trunk group at the switch level.

In step 802, it is determined whether FLEX SAC processing is available for special types of calls over an originating trunk group. For these special types of calls, it is possible to set a flag in the switch indicating whether FLEX SAC is supported. For example, for a calling card call, an authorization call, and a remote access call, a flag may be set in the IXC switch office parameter table indicating whether FLEX SAC processing is supported. The office parameter table is a table containing information relevant to that switch.

For each of these special type calls, it must be determined whether the FLEX SAC office parameters is set to "ON" or "OFF" in the office parameter table for switch 206.

As noted, a remote access call can be considered one category of special type call. For example, suppose a caller has a VNet (Virtual Network) private dialing plan, which is a dialing plan privately defined for a customer at the customer's long distance carrier. If the customer does not have access to the private dialing plan at a remote, off-network facility, the carrier may provide the customer a "1-800" number to dial in order to gain access to the VNet dialing plan. The carrier then uses the "1-800" number dialed by the customer to locate the appropriate VNet dialing plan. After gaining access, the remote VNet customer is prompted to enter the telephone number being called, which may be a FLEX SAC number.

Suppose it is desired to screen remote access calls to determine whether FLEX SAC processing is supported for the call. First, the FLEX SAC office parameter table is checked for a FLEX SAC remote access parameter. If the FLEX SAC remote access parameter is set to "OFF", indicating IXC switch 206 does not support FLEX SAC for remote access type calls, then control is passed to the flow chart shown in FIG. 9. In this case, steps 901 and 902 are invoked as described with relation to step 801 above. Specifically, in step 901 the call is handled as an ordinary DDD call introduced into the IXC network, and in step 902 the switch creates an appropriate call record with the FLEX SAC flag set to "OFF."

Alternatively, if the call is not a special type call, such that step 802 is not invoked, or if the FLEX SAC office parameter for the call in the office parameter table is "ON", then FLEX SAC processing is supported by the IXC switch, and processing is continued to step 803.

In step 803, it is determined whether the received call requires authorization processing. If it is determined that the telephone call requires an authorization code, it must further be determined whether the authorization code for the call is valid.

Authorization code telephone calls are allowed for certain types of incoming calls. For example, in the existing MCI Network, a user may dial 1-800-950-1022 in order to make a calling card call. The resulting call will traverse an FGB trunk and will be routed to an IXC switch that handles FGB traffic.

For example, if user 101 dials "800-950", MCI routes the call over an FGB trunk to a switch that supports FGB service. Once the MCI IXC switch (which supports FGB traffic) receives the call from user 101, the FGB IXC switch permits user 101 to dial appropriate calling card digits in order to route the telephone call to the destination user 108.

Other examples are telephone calls that require an authorization code include the VNet/DAL and VNet/remote access trunks. A VNet/DAL is a call by a customer having a VNet private dialing plan (recognized by the user's IXC carrier) routed over a DAL trunk. A VNet/remote access call is a call by a customer having a VNet private dialing plan routed over an FGC or an FGD trunk, as explained above.

For VNet/DAL or VNet/remote access calls, user 101 dials a SAC. The IXC switch, e.g., IXC switch 206, receives the SAC and returns a dial tone to the user 101. User 101 then dials a VNet telephone number. The VNet number is a sequence of digits known to IXC switches 260–210 and IXC DAPs 216–220 as part of the private dialing plan of user 101. During normal call processing, the VNet number dialed by the user is translated and transmitted to the appropriate destination as previously defined by the customer, in this case user 101.

If in step 803 it is determined that the call requires an authorization code (as discussed above) and the authorization code is not valid, then control is passed to step 901 of FIG. 9, wherein existing processing is performed. In this case, the call will be blocked since the authorization is not valid. Accordingly, user 101 is prevented from completing the call. Subsequently, in step 902 the switch creates an appropriate call record with a FLEX SAC flag set to "OFF", as mentioned above with relation to step 801.

However, if in step 803 it is determined that the call requires an authorization code and the authorization code is valid, then control is passed to step 804, wherein a FLEX SAC query is begun.

Figure 4:
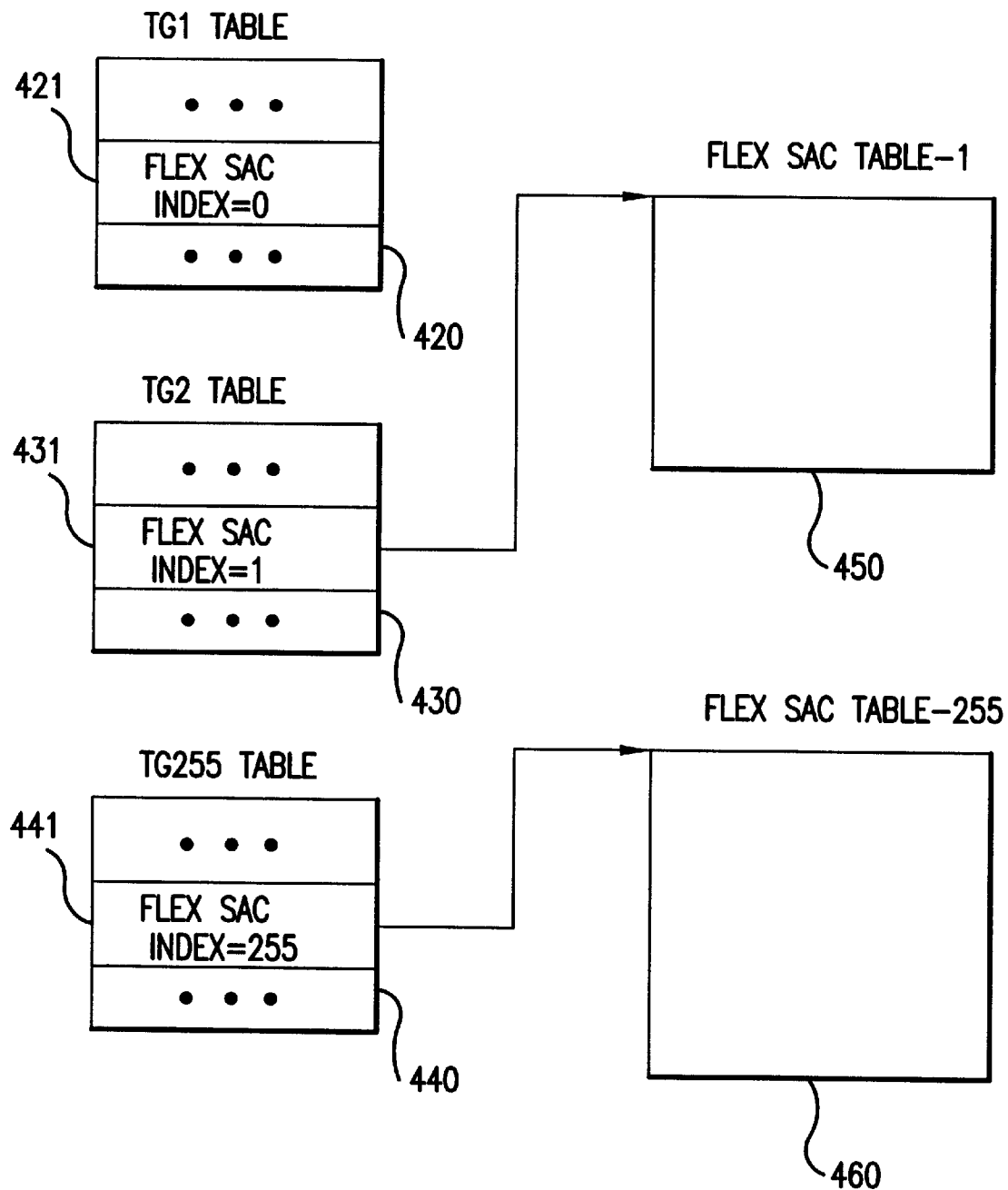
FIG. 4 is a schematic diagram of an exemplary office parameter table for a switch.

FIG. 4 shows a series of tables associated with the FLEX SAC query, specifically identifying how the originating trunk group parameters are stored. OTG1 (originating trunk group) table 420 is an area of storage representing the originating trunk group known to IXC switch 206 as OTG1. OTG2 table 430 is an area of storage representing the originating trunk group known to IXC switch 206 as OTG2. OTG255 table 440 is an area of storage representing the originating trunk route known to IXC switch 206 as OTG255.

OTG1 table 420 has a FLEX SAC index 421 set to 0. OTG2 table 430 has a FLEX SAC index 431 set to 1. OTG255 table 440 has a FLEX SAC index 441 set to 255.

Suppose the call is routed to IXC switch 206 over an originating trunk group that is known to IXC switch 206 as OTG1. OTG1 is represented to IXC switch 206 as OTG1 table 420. OTG1 table 420 has a FLEX SAC index 421 with a value of 0.

Since the FLEX SAC index for the originating trunk group known to IXC switch 206 as OTG1 is equal to 0, then control is passed to step 901 of FIG. 9. In step 901, the call is handled as an ordinary DDD call (wherein existing processing is performed) and subsequently the switch creates an appropriate call record with a FLEX SAC flag set to "OFF". Again, steps 901 and 902 are invoked as described with relation to step 801 above.

Suppose the call is routed to IXC switch 206 over an originating trunk group that is known to IXC switch 206 as OTG2. Since OTG2 is represented to IXC switch 206 as OTG2 table 430, a FLEX SAC index 431 having a value of 1 is retrieved from the table. The FLEX SAC index for an originating trunk group is an index into a group of FLEX SAC tables, each FLEX SAC table representing one originating trunk group. Here, the FLEX SAC index 1 references FLEX SAC table1 450.

Alternatively, suppose the call is routed to IXC switch 206 over an originating trunk group that is known to IXC switch 206 as OTG255. Here, OTG255 table 440 is searched for the FLEX SAC index 441 having a value of 255. FLEX SAC index 255 is used to reference FLEX SAC table255 460.

For this particular switch, namely IXC switch 206, there are 255 originating trunk groups and therefore 255 FLEX SAC tables associated therewith.

Since the FLEX SAC indices for the originating trunk groups known to IXC switch 206 as OTG1 and OTG255 have values greater than zero, control is passed to step 804 wherein a FLEX SAC query is begun.

Figure 10:
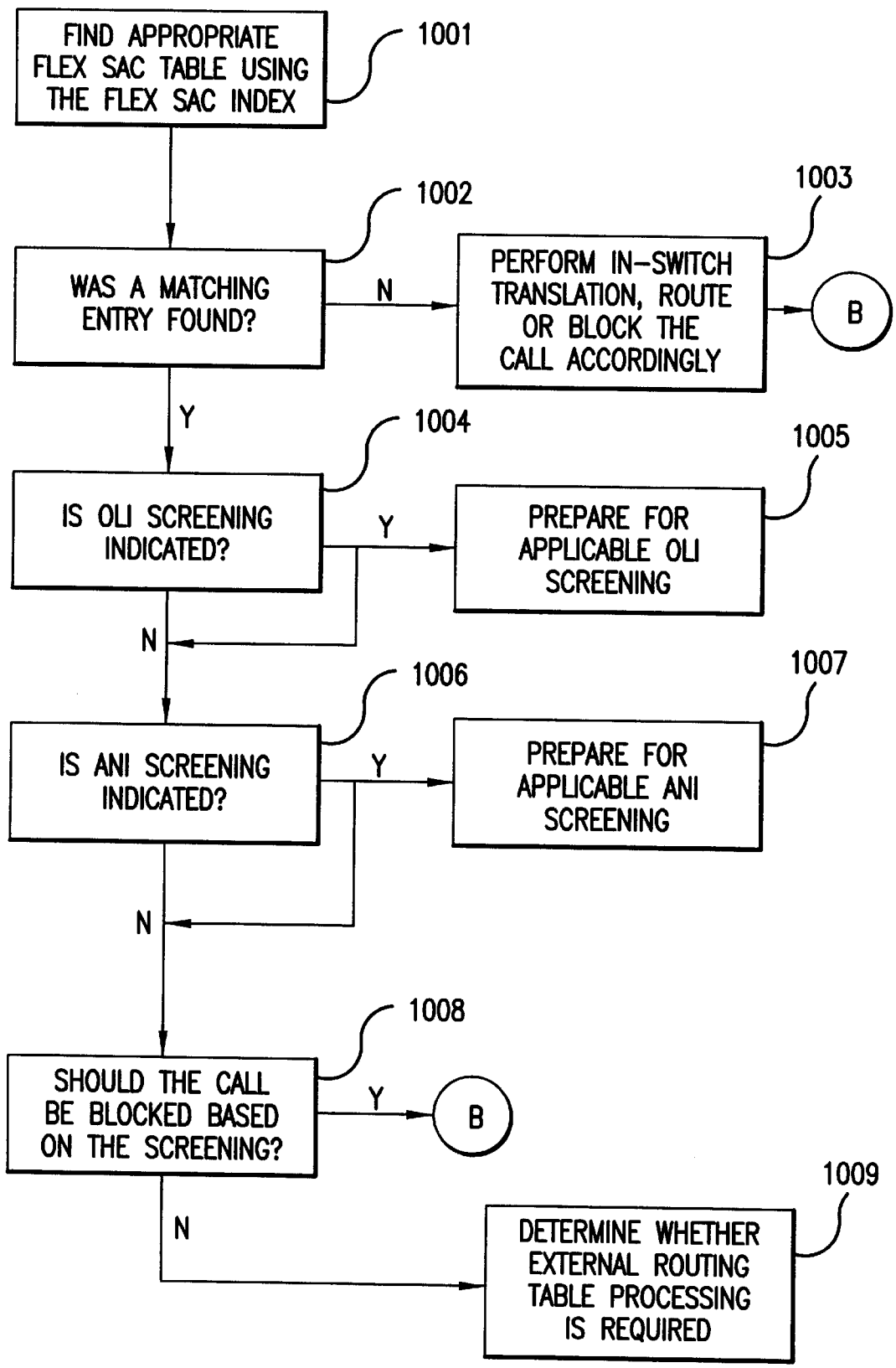
FIG. 10 is a flow chart illustrating FLEX SAC query processing in detail.

FIG. 10 is a flowchart illustrating FLEX SAC query processing in detail. In step 1001, the FLEX SAC index is used to find the appropriate FLEX SAC table corresponding to the originating trunk group over which the call was routed.

Figure 5:
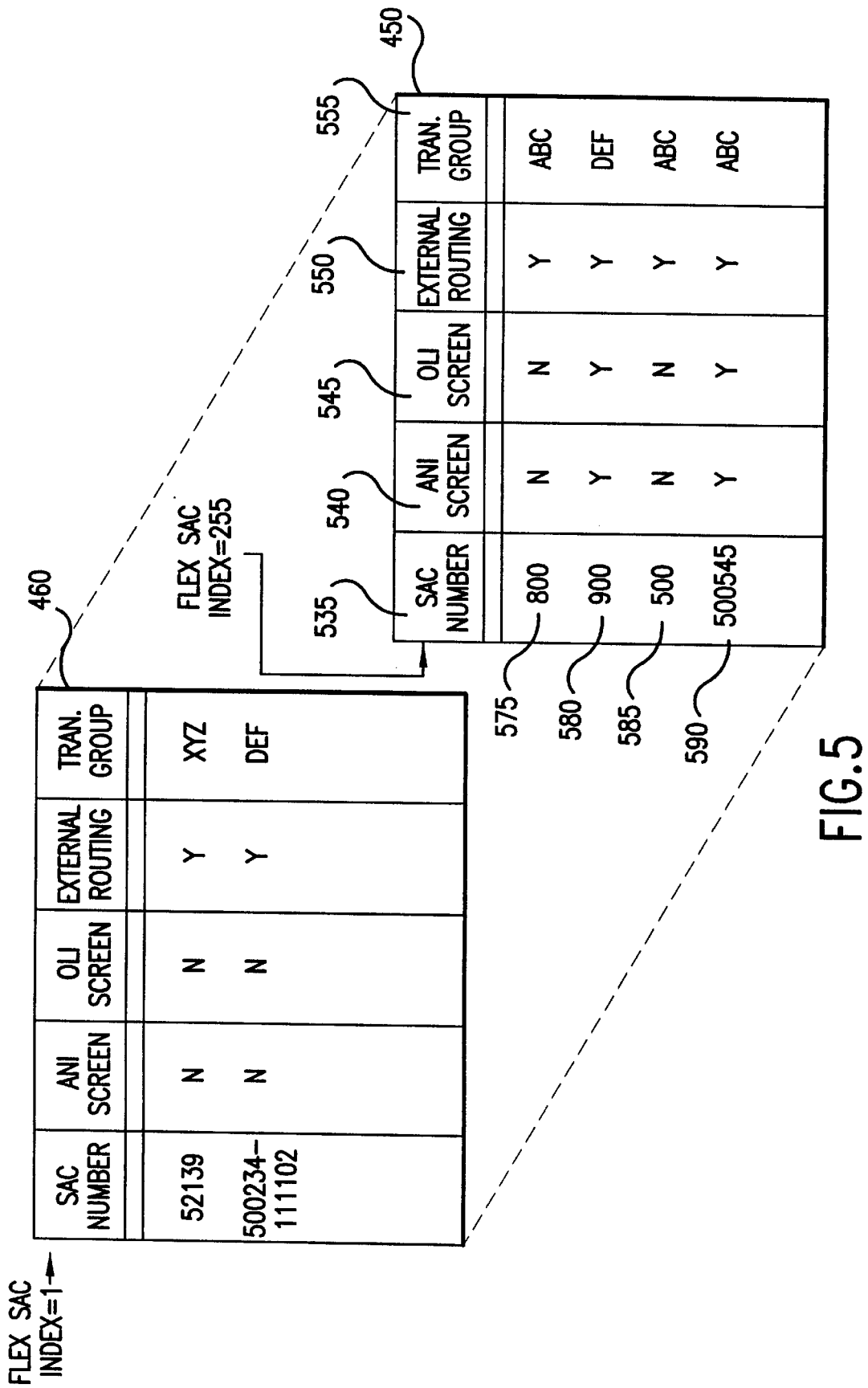
FIG. 5 is a detailed illustration of flexible service access code (FLEX SAC) tables.

FIG. 5 shows FLEX SAC table1 450 and FLEX SAC table255 460 for the originating trunk groups respectively known to IXC switch 206 as OTG1 and OTG255 in greater detail. As shown therein, the FLEX SAC index 1 references FLEX SAC table1 and FLEX SAC index 255 references FLEX SAC table255. Each of the FLEX SAC tables1–255 represent a unique originating trunk group, i.e., OTG1 through OTG255.

FLEX SAC table1 450 has the following fields: a SAC number field 535, an ANI screen field 540, an OLI screen field 545, an external routing table field 550, and a transaction group field 555. Similarly, FLEX SAC table255 460 has the following fields: a SAC number field 510, an ANI screen field 515, an OLI screen field 520, an external routing table field 525, and a transaction group field 530.

The SAC number fields 535, 510 are used to designate FLEX SAC values recognized by IXC switch 206 for the originating trunk groups OTG1 and OTG255, respectively. In the preferred embodiment, SAC number fields 510, 535 are to have up to 15 digits between 0 and 9, i.e., up to XXXXXXXXXXXXXXX. Since the SAC number field has a long length, it allows the IXC network the flexibility to designate international numbers as FLEX SAC numbers.

In step 1002, it is determined whether the SAC portion of the number transmitted over the originating trunk group and received at the IXC switch matches the SAC number field in the appropriate FLEX SAC table. For example, if the call is received at IXC switch 206 over the originating trunk group known to IXC switch 206 as OTG2, then FLEX SAC table1 450 is referenced. The SAC number field 535 for FLEX SAC table1 provides the list of acceptable FLEX SAC numbers for the originating trunk group known to IXC switch 206 as OTG2. Here, the acceptable SAC numbers in SAC number field 535 include "800" (field 575), "900" (field 580), "500" (field 585), and "500545" (field 590), graphically illustrated in column format. In other words, the originating trunk group known to IXC switch 206 as OTG2 accepts as valid FLEX SAC numbers: 800, 900, 500, and 500545.

As mentioned above, for a typical FGC call, the SAC number is received at IXC switch 206 without intermediate translation. For an FGD call, the number outpulsed from LEC switch 103 may, for example, be a translated version of the number originally dialed by IXC user 101. Therefore, for any type of call wherein a translation is performed at the LEC switch before the number is outpulsed to the IXC network, the IXC switch (e.g., IXC switch 206) will translate the received digits back to a FLEX SAC number recognizable to the FLEX SAC tables. In other words, the SAC number fields in the FLEX SAC tables need not be the same as the FLEX SAC number dialed by the user. Alternatively, IXC switch 206 may store the number originally dialed by IXC user 101 in an alternate format, after translation by the IXC switch. Such translations are commonplace to the telecommunications art and are easily recognizable by those of ordinary skill.

In step 1002, if a matching entry is not found, (i.e., the number dialed by IXC user 101 and routed over the originating trunk group known to IXC switch 206 as OTG2 is not found in SAC number field 535) then control is passed to step 1003. In step 1003, IXC switch 206 performs in-switch translation of the received number, and routes or blocks the call accordingly.

FIG. 6A illustrates a simplified version of an in-switch translation table 510 which will serve to demonstrate the in-switch translation step 1003. Suppose the FLEX SAC number received by IXC switch 206 is 123456 and the originating trunk group (over which the call was routed) is recognized by IXC switch 206 as OTG1. Initially, the above-mentioned processing is performed, wherein the office parameter table 410 is parsed to locate the appropriate originating trunk group table, namely, FLEX SAC table1 450. Since 123456 is not found in the SAC number field 535 for FLEX SAC table1 450, in-switch translation must be performed.

Referring to FIG. 6A, the received number field 601 of in-switch translation table 610 is searched for the number 123456. The number 123456 is located in field 603 of the received number field 601. In-switch translation table 610 provides a destination number 804-555-5555 that corresponds to the received number 123456 in field 604 (under the destination number field 602). In the instant case, IXC switch 206 routes the call to the destination number 804-

555-555. However, in-switch translation table 610 may also indicate that the call is to be blocked, wherein user 101 is prevented from completing the call.

After step 1003, wherein the call is translated and routed (or blocked), control is passed to step 902 of FIG. 9, wherein the switch creates an appropriate call record for the call. In this case, since FLEX SAC call processing has been invoked in step 1001, the call record is built with a FLEX SAC flag set to "ON."

On the other hand, if in step 1002 a matching entry for the number dialed by IXC user 101 is found in the SAC number fields 510, 535, then control is passed to 1004.

In step 1004, it is determined whether Originating Line Information (OLI) screening is to be performed for the SAC number dialed by IXC user 101 by checking the OLI screen field 545 for the relevant SAC number found in the SAC number field 535. OLI provides the IXC network 105 information regarding the location of the originating caller, which in this case is IXC user 101. OLI information may inform IXC network 105 that the call is from a hospital, a prison, etc. For example, if IXC network 105 determines that the originating caller is a prison, then the network may choose to block the call because it may be impossible to bill the originating caller. OLI is typically provided for only certain types of trunks, such as FGD and Reseller trunks.

In step 1004, if it is determined that OLI screening is applicable for the received call, then control is passed to step 1005. In step 1005, IXC switch 206 prepares for OLI screening, wherein a flag is set in local memory to indicate that OLI screening is to be performed for the received call.

After step 1005 has been implemented, or alternatively, if in step 1004 OLI screening is not indicated for the received call, control is passed to step 1006. In step 1006, it is determined whether Automatic Number Identification (ANI) screening is to be performed for the SAC number dialed by IXC user 101 by checking the ANI screen field 540 for the relevant SAC number found in the SAC number field 535. ANI is a feature of the signaling system used by IXC network 105, providing the exact telephone number of the originating caller, which in this case is user 101. ANI is typically provided for only certain types of trunks, such as FGD and Reseller trunks.

In step 1006, if it is determined that ANI screening is to be performed for the received call, then control is passed to step 1007. In step 1007, IXC switch 206 prepares for ANI screening, wherein a flag is set in local memory to indicate that ANI screening is applicable for the received call.

After step 1007 has been implemented, or alternatively, if in step 1006 ANI screening is not indicated for the received call, control is passed to step 1008.

In step 1008, actual OLI and ANI screening is performed. If a flag was set in local memory to indicate that OLI screening is to be performed for the received call, then OLI screening is actually performed in step 1008. Specifically, the OLI digits of the received call (defined to IXC switch 206) are used to determine whether the call should be blocked or not.

Similarly, if a flag was set in local memory to indicate that ANI screening is to be performed for the received call, then ANI screening is actually performed in step 1008. Specifically, the ANI digits of the received call, which happens to be the NPA-NXX-XXXX telephone number of the originating caller, are used to determine whether the call should be blocked or not.

If in step 1008 it is determined that the call should be blocked, control is passed to step 902 of FIG. 9, wherein the switch creates an appropriate call record for the call. However, since FLEX SAC call processing has been invoked in step 1001, the call record is built with a FLEX SAC flag set to "ON."

Alternatively, if in step 1008 it is determined that the call should not be blocked, control is passed to step 1009, wherein it is determined whether an external routing table should be used to route the call.

The following example will demonstrate OLI and ANI screening and blocking. Referring to FIG. 4, suppose the SAC number 500545 is received at IXC switch 206 from a call transmitted over an originating trunk group known to IXC switch 206 as OTG2 413. In OTG2 table 430, FLEX SAC index 431 having the value of 1 is used to index FLEX SAC table1 450.

Referring to FIG. 5, the SAC number field 535 in FLEX SAC table1 450 is searched for a match to the received number 500545. The value 500545 is found in field 590 of SAC number field 535.

Since the OLI screen field 545 for the dialed number 500545 is set to "Y", indicating that OLI screening is to be performed for the received call, a flag is set in local memory to indicate that OLI screening is to be performed for the received call. In addition, since the ANI screen field 540 for the dialed number 500545 is set to "Y", indicating that ANI screening is to be performed for the received call, a flag is set in local memory to indicate that ANI screening is to be performed for the received call.

FIG. 6B shows an OLI screening table 620 defined to IXC switch 206. OLI screening table 620 has OLI field 621, indicating the OLI numbers 623 recognized to switch 206, and block field 622 indicating with a "Y" or a "N" (field 624) whether the call should be blocked for the recognized OLI number 623.

FIG. 6C shows an ANI screening table 630 defined to IXC switch 206. ANI screening table 630 has ANI field 631, indicating the ANI numbers 633 recognized to switch 206, and block field 632 indicating with a "Y" or a "N" (field 634) whether the call should be blocked for the recognized ANI number 633.

Since a flag was set in local memory to indicate that OLI screening is to be performed for the received call (the dialed number 500545), OLI screening table 620 screens the appropriate OLI digits for the originating caller, namely the OLI digits for user 101. In the instant case, AB (a hypothetical OLI field 623) is matched to the OLI number for user 101. The corresponding value and block field 622 is "N." Accordingly, the originating caller, which in this case is user 101, is not to be blocked by IXC network 105, specifically at IXC switch 206.

Similarly, since a flag was set in local memory to indicate that ANI screening is to be performed for the received call (the dialed number 500545), ANI screening table 630 screens the appropriate ANI digits for the originating caller, namely the ANI digits for user 101. In the instant case, ABC-DEF-GHIJ (a hypothetical ANI field 633) is matched to the ANI number for user 101. The corresponding value and block field 632 is "N." Accordingly, the originating caller, which in this case is user 101, is not to be blocked by IXC network 105, specifically at IXC switch 206.

If there is no match for an entry in the OLI screening table 6B, or in the ANI screening table 630 above, then the call is allowed by default to proceed anyway. Here, the call proceeds to step 1009.

Figure 11:
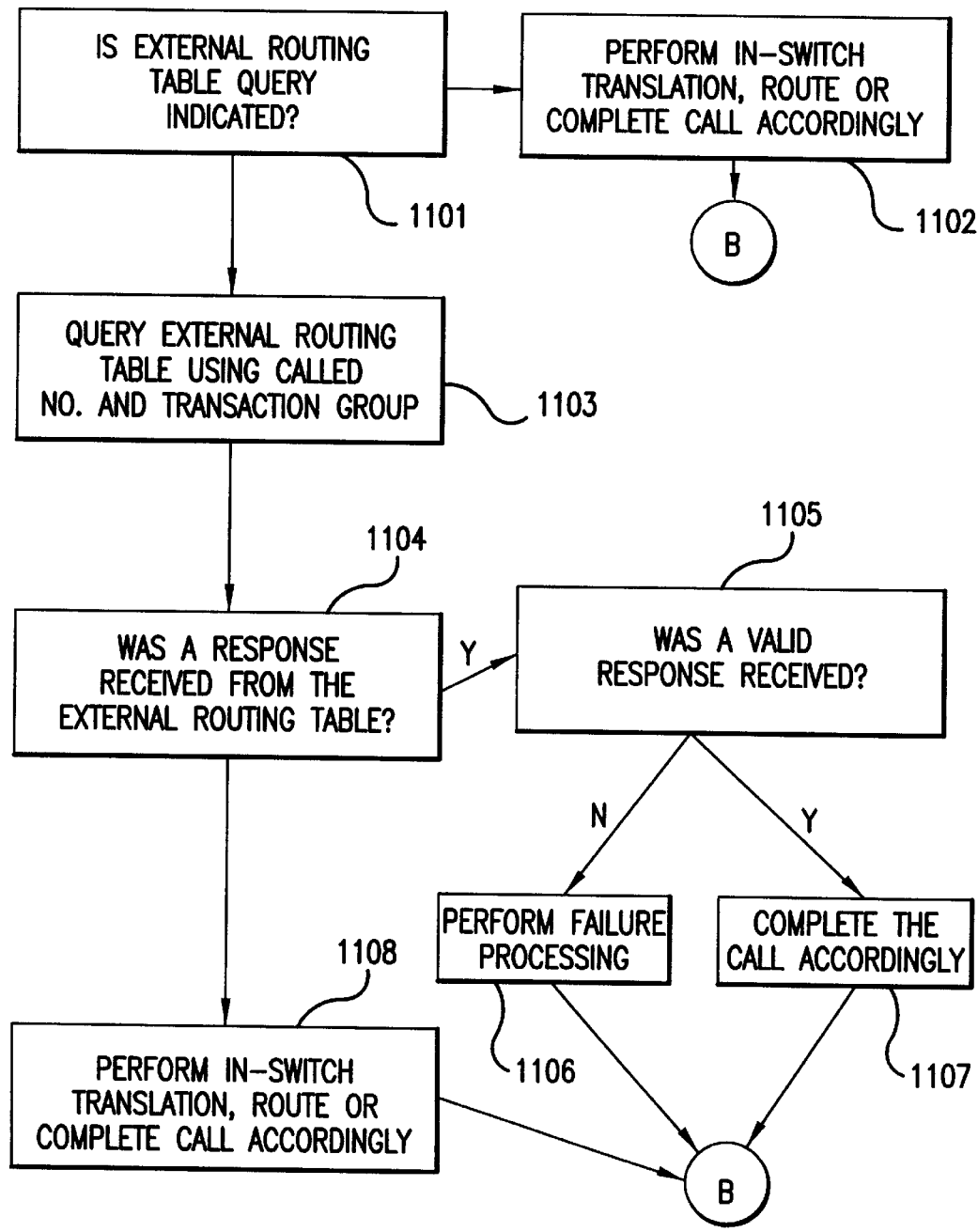
FIG. 11 is a flow chart illustrating implementation of an external routing table and completion of FLEX SAC processing.

In step 1009, it must be determined whether an external routing table will be used to process the call, and control is passed to the process of FIG. 11.

FIG. 11 illustrates the process for using an external routing table to route the call in detail. In step 1101, it must be determined whether an external routing table is to be queried for the call received on the originating trunk group. As mentioned, a DAP 216–220 is one instance of an external routing table. Referring to FLEX SAC table1 450, the external routing table query field 550 for the received FLEX SAC number 500545 indicates that an external routing table is necessary.

If in step 1101 the FLEX SAC table indicates that an external routing table query is not supported, then control is passed to step 1102. In step 1102, IXC switch 206 performs in-switch translation of the received number, and routes or blocks the call accordingly in a similar fashion as described with relation to step 1003. As with step 1003, after step 1102, control is passed to step 902 of FIG. 9, wherein the switch creates an appropriate call record for the call. Since FLEX SAC call processing has been invoked in step 1001, the call record is built with a FLEX SAC flag set to "ON."

Alternatively, if in step 1101 the FLEX SAC table indicates that an external routing table query is supported, then control is passed to step 1103. In step 1103, the external routing table (e.g., DAP 216–220) is queried using the called number and the transaction group for the call.

Returning to the above-mentioned example, wherein the number 500542 is received at IXC switch 206, the transaction group number for the received number 500545 must be determined. Referring to FIG. 5, the SAC number 500545 has a corresponding transaction group number (located within transaction group field 555) that is symbolically designated by the digits ABC. Since the transaction group field is internally recognized by the IXC, the digits are insignificant. The transaction group number will indicate to the external routing table the type of call that is to be processed. For example, in the instant case, the digits ABC will be recognized by the external routing table as an "800" INWATS special service type call. Next, a query message is sent to the external routing table (e.g., DAP 216–220) which includes the transaction group digits ABC, as well as the received number 500545.

FIG. 6D illustrates an exemplary external routing table 640. External routing table 640 includes a received number field 641, a transaction number field 642, an availability (date/time) field 643, a status field 644, a destination number field 645, and an alternate number field 646. The received number field 641 indicates the call received by IXC switch 206. For example, in the instant case the received number is 123456.

The transaction number 642 field indicates a transaction number associated with the received number. For example, in the instant case the transaction number ABC corresponds to the received FLEX SAC number 500545.

The availability (date/time) field 643 indicates when the destination user desires to receive a special service processing call. For example, in the instant case the destination user 108 is capable of receiving a FLEX SAC call at any time. However, alternatively the destination user may designate that the call is to be received only at particular times during the day, days during the week, etc.

The status field 644 indicates whether the destination is available or busy. For example, in the instant case the destination for the called number, i.e., 123456, is currently available to receive a call.

The destination number field 645 is the destination DDD number to which the call is to be routed. In other words, when user 101 dials 123456, external routing table 640 attempts to route the call to destination 837-555-5555.

The alternate number field 646 provides an alternate number that is to be dialed in case the destination number is unavailable, as determined by status field 644. For example, in the instant case if the destination number 837-555-5555 were busy, then the call would be routed to 202-444-4444.

In step 1104, after querying the external translation table using the called number and the transaction group number, the IXC switch awaits a response from the external translation table. In step 1104, if after waiting for a predesignated period of time, the IXC switch does not receive a response, then control is passed to step 1108.

In step 1108, processing is handled exactly the same as for step 1102. Specifically, IXC switch 206 performs in-switch translation of the received number, and routes or blocks the call accordingly in a similar fashion as described with relational step 1003. In addition, after step 1108, control is passed to step 902 of FIG. 9, wherein the switch creates an appropriate call record for the call. Since FLEX SAC call processing has been invoked in step 1001, the call record is built with a FLEX SAC flag set to "ON."

If in step 1104 a response from the external translation table is received within a predesignated period of time, then control is passed to step 1105. In step 1105, it is determined whether a valid routing response was returned from the external translation table. If a valid routing response is returned from the external translation table, then control is passed to step 1107, wherein the call is completed accordingly. Under normal circumstances, the external translation table will inform the IXC switch whether the destination is available to receive the call, or alternatively if the call should be blocked.

After the call is completed, control is passed to step 902 of FIG. 9, wherein the switch creates an appropriate call record for the call. Again, since FLEX SAC call processing has been invoked, the call record is built with a FLEX SAC flag set to "ON."

On the other hand, if the response returned from the external translation table is not valid, meaning that the response is not recognized by the IXC switch, then control is passed to step 1106. In step 1106, the IXC switch will perform failure processing for the call. In one embodiment, a return code indicating failure is sent back to the originator of the call. For example, in the instant case IXC switch 206 may send a return code that indicates failure back to a PBX switch of the originating caller 101. The PBX will then determine how to handle the call. The PBX may initiate a new call to the LEC for completion, or inform the originating caller that the call was not completed.

For example, in the MCI network a Release With Cause (RWC) is the return code sent back to the PBX for a call over a DAL trunk, a PRI trunk, or an ISUP trunk. PRI (primary rate interface) is a protocol used by large businesses for accessing ISDN (integrated digital services network). ISUP (ISDN User Part) is a protocol, comprising a portion of the SS7 signaling network, which is used to make an end to end simple telephone call.

After step 1106, control is passed to step 902 of FIG. 9, wherein the switch creates an appropriate call record for the call. Since FLEX SAC call processing has been invoked in step 1001, the call record is built with a FLEX SAC flag set to "ON."

While the invention has been particularly shown and described with reference to preferred embodiments thereof, it will be understood by those skilled in the relevant art that various changes in form and details may be made therein without departing from the spirit and scope of the invention.

What is claimed is:

1. In a telephone communications system having a switch for receiving a call and an originating trunk line for routing the call from an originating caller to the switch, a method for providing flexibility to accept and route flexible service access codes not restricted to a pre-determined three-digit extension that are dialed by an originating caller for special service calls, comprising the steps of:

(a) determining whether the switch receiving a call supports processing of flexible service access codes;

(b) if it is determined that the switch receiving the call supports flexible service access codes, then determining whether the originating trunk group over which the call was routed supports flexible service access codes and processing the call as a flexible service access code special service call;

(c) if it is determined that the switch receiving the call does not support flexible service access codes, then processing the call as a common telephone call by routing the call to a destination caller and building a call record for the call.

2. A method of claim 1, wherein step (b) further comprises the steps of:

(d) if it is determined that the call requires authorization processing, then determining whether an authorization code received for the call is valid;

(e) if in step (d) it is determined that the authorization code is not valid, then blocking the call and building a call record indicating that flexible service access code processing is not supported for the call.

3. A method of claim 1, wherein step (b) further comprises the step of:

if it is determined that the originating trunk group over which the call was routed does not support flexible service access codes, then routing the call as a non-flexible service access code special service call or as a common telephone call and building a call record indicating that flexible service access code processing is not supported for the call.

4. A method of claim 1, wherein step (b) further comprises the step of:

if it is determined that the originating trunk group over which the call was routed supports flexible service access codes, then attempting to match a called number dialed by the originating caller to a flexible service access code entry in a flexible service access code table designated for said originating trunk group.

5. A method of claim 4, further comprising the step of:

if the called number is matched to said flexible service access code entry, then parsing the flexible service access code table for flexible service access code parameters.

6. A method of claim 5, further comprising the step of:

if the flexible service access code table indicates that originating line information screening is required, then determining whether to block the call according to the originating line information of the originating caller.

7. A method of claim 5, further comprising the step of:

if the flexible service access code table indicates that automatic number identification screening is required, then determining whether to block the call according to the automatic number identification information of the originating caller.

8. A method of claim 5, further comprising the step of:

if the flexible service access code table indicates that an external routing table must be used to route the call, then querying the external routing table by sending to the external routing table the called number and a transaction group identification number located in the flexible service access code table corresponding to the called number.

9. A method of claim 8, further comprising the steps of:

if a response is not received from the external routing table after a pre-determined period, and if the called number is matched to an entry in an in-switch translation table, then routing the call to said entry in said in-switch translation table and building a call record indicating that flexible service access code processing is supported by the call;

if a response is not received from the external routing table after a pre-determined period, and if the called number is not matched to an entry in an in-switch translation table, then blocking the call from being routed and building a call record indicating that flexible service access code processing is supported by the call.

10. A method of claim 8, wherein if a response is received from the external routing table after a pre-determined period and the response is valid, then routing the call as indicated by the external routing table and building a call record indicating that flexible service access code processing is supported for the call.

11. A method of claim 8, wherein if a response is received from the external routing table after a pre-determined period and the response is not valid, then performing failure processing for the call by returning a failure code via the originating trunk group for which the call was routed.

12. A method of claim 11, wherein the failure code is returned for a trunk group using any of a direct access line, a primary rate interface protocol line, an integrated services digital network user part protocol line.

13. A method of claim 5, further comprising the steps of:

if the flexible service access code table indicates that an external routing table is not to be used to route the call, and if the called number is matched to an entry in an in-switch translation table, then routing the call to said entry in said in-switch translation table and building a call record indicating that flexible service access code processing is supported by the call;

if the flexible service access code table indicates that an external routing table is not to be used to route the call, and if the called number is not matched to an entry in an in-switch translation table, then blocking the call from being routed and building a call record indicating that flexible service access code processing is supported by the call.

14. A method of claim 4, wherein step (b) further comprises the step of:

if the called number is not matched to said flexible service access code entry, and if the called number is matched to an entry in an in-switch translation table, then routing the call to said called number and building a call record indicating that flexible service access code processing is supported by the call.

15. A method of claim 4, wherein step (b) further comprises the step of:

if the called number is not matched to said flexible service access code entry, and if the called number is not matched to an entry in an in-switch translation table, then blocking the call from being routed and building a call record indicating that flexible service access code processing is supported by the call.

16. A system for providing flexibility to accept and route flexible service access codes not restricted to a pre-determined three-digit extension that are dialed by an originating caller for special service calls, comprising:

a switch for receiving a call;

an originating trunk line for routing the call from an originating caller to said switch;

means for determining whether the switch receiving a call supports processing of flexible service access codes;

means for determining whether the originating trunk group over which the call was routed supports flexible service access codes;

means for processing the call as a flexible service access code special service call, if it is determined that the switch receiving the call supports flexible service access codes and it is determined that the originating trunk group over which the call was routed supports flexible service access codes; and means for processing the call as a common telephone call by routing the call to a destination caller and for building a call record for the call, if it is determined that the switch receiving the call does not support flexible service access codes or it is determined that the originating trunk group over which the call was routed does not support flexible service access codes.

17. A system of claim 16, further comprising:

means for determining whether an authorization code received for the call is valid, if it is determined that the call requires authorization processing; and means for blocking the call and for building a call record indicating that flexible service access code processing is not supported for the call, if it is determined that the authorization code received for the call is not valid.

18. A system of claim 16, further comprising:

means for routing the call as a non-flexible service access code special service call or as a common telephone call and for building a call record indicating that flexible service access code processing is not supported for the call, if it is determined that the originating trunk group over which the call was routed does not support flexible service access codes.

19. A system of claim 16, further comprising:

means for attempting to match a called number dialed by the originating caller to a flexible service access code entry in a flexible service access code table designated for said originating trunk group, if it is determined that the originating trunk group over which the call was routed supports flexible service access codes.

20. A system of claim 19, further comprising:

means for parsing the flexible service access code table for flexible service access code parameters, if the called number is matched to said flexible service access code entry.

21. A system of claim 20, further comprising:

means for determining whether to block the call according to the originating line information of the originating caller, if the flexible service access code table indicates that originating line information screening is required.

22. A system of claim 20, further comprising:

means for determining whether to block the call according to the automatic number identification information of the originating caller, if the flexible service access code table indicates that automatic number identification screening is required.

23. A system of claim 20, further comprising:

means for querying the external routing table by sending the external routing table the called number and a transaction group identification number located in the flexible service access code table corresponding to the called number, if the flexible service access code table indicates that an external routing table must be used to route the call.

24. A system of claim 23, further comprising:

means for routing the call to said entry in said in-switch translation table and building a call record indicating that flexible service access code processing is supported by the call, if a response is not received from the external routing table after a pre-determined period, and if the called number is matched to an entry in an in-switch translation table;

means for blocking the call from being routed and building a call record indicating that flexible service access code processing is supported by the call, if a response is not received from the external routing table after a predetermined period, and if the called number is not matched to an entry in an in-switch translation table.

25. A system of claim 23, further comprising:

means for routing the call as indicated by the external routing table and building a call record indicating that flexible service access code processing is supported for the call, if a response is received from the external routing table after a pre-determined period and the response is valid.

26. A system of claim 23, further comprising:

means for performing failure processing for the call by returning a failure code via the originating trunk group for which the call was routed, if a response is received from the external routing table after a pre-determined period and the response is not valid.

27. A system of claim 26, further comprising:

means for returning the failure code for any one of a trunk group using a direct access line, a primary rate interface protocol line, or an integrated services digital network user part protocol line.

28. A system of claim 20, further comprising:

means for routing the call to said entry in said in-switch translation table and building a call record indicating that flexible service access code processing is supported by the call, if the flexible service access code table indicates that an external routing table is not to be used to route the call, and if the called number is matched to an entry in an in-switch translation table; and means for blocking the call from being routed and building a call record indicating that flexible service access code processing is supported by the call, if the flexible service access code table indicates that an external routing table is not to be used to route the call, and if the called number is not matched to an entry in an in-switch translation table.

29. A system of claim 19, further comprising:

means for routing the call to said number and building a call record indicating that flexible service access code processing is supported by the call, if the called number is not matched to said flexible service access code entry, and if the called number is matched to an entry in an in-switch translation table; and means for blocking the call from being routed and building a call record indicating that flexible service access code processing is supported by the call, if the called number is not matched to said flexible service access code entry, and if the called number is not matched to an entry in an in-switch translation table.

* * * * *